(12) United States Patent
Tateishi et al.

(10) Patent No.: US 11,404,685 B2
(45) Date of Patent: Aug. 2, 2022

(54) ANODE, AND SULFIDE SOLID-STATE BATTERY

(71) Applicant: TOYOTA JIDOSHA KABUSHIKI KAISHA, Aichi-ken (JP)

(72) Inventors: Mitsuru Tateishi, Susono (JP); Yusuke Okuhata, Susono (JP); Hajime Hasegawa, Susono (JP); Hirokazu Kawaoka, Nisshin (JP); Hideaki Miyake, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 464 days.

(21) Appl. No.: 16/354,426

(22) Filed: Mar. 15, 2019

(65) Prior Publication Data

US 2019/0305294 A1  Oct. 3, 2019

(30) Foreign Application Priority Data

Mar. 29, 2018 (JP) .............................. JP2018-065852
Sep. 27, 2018 (JP) .............................. JP2018-182465

(51) Int. Cl.
*H01M 10/0585* (2010.01)
*H01M 4/134* (2010.01)
(Continued)

(52) U.S. Cl.
CPC ........... *H01M 4/134* (2013.01); *H01M 4/386* (2013.01); *H01M 4/5815* (2013.01);
(Continued)

(58) Field of Classification Search
CPC ...... H01M 4/134; H01M 4/386; H01M 4/662; H01M 4/667; H01M 4/624; H01M 4/364;
(Continued)

(56) References Cited

U.S. PATENT DOCUMENTS

2009/0202908 A1  8/2009  Sumihara et al.
2011/0065007 A1  3/2011  Kamiya et al.
(Continued)

FOREIGN PATENT DOCUMENTS

CN    105027346 A    11/2015
JP    2000-208149 A   7/2000
(Continued)

OTHER PUBLICATIONS

Chris P. Schaller, "Factors that Influence Reduction Potential", Chemistry Libre Texts, Aug. 16, 2020, pp. 1-3, XP055796926 (3 pages).

(Continued)

*Primary Examiner* — Stephen J Yanchuk
(74) *Attorney, Agent, or Firm* — Sughrue Mion, PLLC

(57) ABSTRACT

Copper reacts with a sulfide solid electrolyte to generate copper sulfide when an anode current collector layer made from copper, and an anode mixture layer containing the sulfide solid electrolyte are used to compose an anode, and the resistance of the interface between the anode current collector layer and the anode mixture layer increases. To alloy an anode current collector layer to lower the reactivity to a sulfide solid electrolyte, specifically, an anode includes: an anode mixture layer; and an anode current collector layer that is in contact with the anode mixture layer, wherein the anode mixture layer contains an anode active material and a sulfide solid electrolyte, and at least a surface of the anode current collector layer is made from material that contains an alloy of copper and metal of a higher ionization tendency than copper, the surface being in contact with the anode mixture layer.

14 Claims, 11 Drawing Sheets

(51) Int. Cl.
*H01M 4/38* (2006.01)
*H01M 4/66* (2006.01)
*H01M 10/0562* (2010.01)
*H01M 4/58* (2010.01)
*H01M 10/052* (2010.01)
*H01M 4/62* (2006.01)
*H01M 4/02* (2006.01)

(52) U.S. Cl.
CPC ........... *H01M 4/624* (2013.01); *H01M 4/662* (2013.01); *H01M 10/052* (2013.01); *H01M 10/0562* (2013.01); *H01M 10/0585* (2013.01); *H01M 2004/027* (2013.01); *H01M 2300/0068* (2013.01)

(58) Field of Classification Search
CPC ........... H01M 10/052; H01M 10/0585; H01M 10/0562; H01M 2004/027
See application file for complete search history.

(56) References Cited

U.S. PATENT DOCUMENTS

| | | |
|---|---|---|
| 2014/0346048 A1 | 11/2014 | Kohiki et al. |
| 2015/0017549 A1 | 1/2015 | Nishimura et al. |
| 2015/0349378 A1 | 12/2015 | Ose et al. |
| 2016/0197351 A1 | 7/2016 | Tani et al. |
| 2016/0285076 A1* | 9/2016 | Yamamoto ............... C22C 24/00 |
| 2016/0294004 A1 | 10/2016 | Sasaki et al. |
| 2020/0028166 A1* | 1/2020 | Tanaka ................... H01M 4/36 |

FOREIGN PATENT DOCUMENTS

| | | |
|---|---|---|
| JP | 2011-060649 A | 3/2011 |
| JP | 2012-049023 A | 3/2012 |
| JP | 2013-181236 A | 9/2013 |
| JP | 2014-137869 A | 7/2014 |
| JP | 5535158 B2 | 7/2014 |
| JP | 2015-069848 A | 4/2015 |
| KR | 10-2014-0137371 A | 12/2014 |
| WO | 2013/140942 A1 | 9/2013 |
| WO | 2014/156638 A1 | 10/2014 |

OTHER PUBLICATIONS

Petr Vanýsek: "Electrochemical Series" Internet Citation, Jan. 1, 2000, XP008169077, URL http://catedras.quimica.unlp.edu.ar/qa2/guias/tablas.pdf,13 Pages.

Davis J R, Ed: "Standard Designations for Wrought and Cast Copper and Copper Alloys" ASM Specialty Handbook: Copper and Copper Alloys, Jan. 1, 2001, ASM Specialty Handbook. Copper and Copper Alloys; [ASM Specialty Handbook], Materials Park, Ohio: ASM International, USA, pp. 14-26, XP002482353.

Harkness J C, et al: "Beryllium-Copper and Other Beryllium-Containing Alloys", Jan. 1, 1990, Properties and Selection: Non-ferrous Alloys and Special Purpose Materials; [Metals Handbook], Metals Park, ASM, US, pp. 403-423, XP002045188.

* cited by examiner

ANODE, AND SULFIDE SOLID-STATE BATTERY

FIELD

The present application discloses an anode and a sulfide solid-state battery using a sulfide solid electrolyte.

BACKGROUND

When an anode is composed using an anode current collector layer made from copper, and an anode mixture layer containing a sulfide solid electrolyte in a sulfide solid-state battery including the anode, a cathode, and a solid electrolyte layer, copper reacts with the sulfide solid electrolyte to generate copper sulfide etc., which increases the resistance of the interface between the anode current collector layer and the anode mixture layer and leads to an irreversible reaction of copper sulfide with a lithium ion, to lower the battery capacity, which is problematic. Patent Literature 1 discloses, as one means for solving this problem, to provide a reaction-inhibiting layer containing a predetermined element between an anode mixture layer and an anode current collector layer.

Such a technique is known as disclosed in Patent Literature 2 as to suppress reaction of an active material with a sulfide solid electrolyte in a sulfide solid-state battery. However, it is difficult to use this technique as a technique for suppressing reaction of an anode current collector layer with a sulfide solid electrolyte.

CITATION LIST

Patent Literature

Patent Literature 1: JP 2012-049023 A
Patent Literature 2: JP 2011-060649 A

SUMMARY

Technical Problem

A reaction-inhibiting layer has to be added between an anode mixture layer and an anode current collector layer in the technique disclosed in Patent Literature 1, which raises problems of complicated steps of producing a battery, and a low volumetric energy density of the battery. That is, an object is how to suppress reaction of an anode current collector layer with a sulfide solid electrolyte in an anode mixture layer without especially adding a reaction-inhibiting layer.

Solution to Problem

The present application discloses, as one means for solving the problem, an anode comprising: an anode mixture layer; and an anode current collector layer that is in contact with the anode mixture layer, wherein the anode mixture layer contains an anode active material and a sulfide solid electrolyte, and at least a surface of the anode current collector layer is made from material that contains an alloy of copper and metal of a higher ionization tendency than copper, the surface being in contact with the anode mixture layer.

In the anode of the present disclosure, the alloy preferably contains copper, and at least one selected from zinc, beryllium, and tin.

In the anode of the present disclosure, the alloy preferably contains copper and zinc.

In the anode of the present disclosure, the anode active material preferably contains a silicon-based active material.

In the anode of the present disclosure, tensile strength of the anode current collector layer is preferably no less than 500 MPa.

In the anode of the present disclosure, an elongation after fractures of the anode current collector layer is preferably no less than 7.95%.

The present application discloses, as one means for solving the problem, a sulfide solid-state battery comprising: the anode of the present application; a cathode; and a solid electrolyte layer provided between the anode and the cathode.

Advantageous Effects

According to new findings of the inventors of the present disclosure, when copper is combined with metal of a higher ionization tendency than copper to alloy, its electrochemical reactivity to a sulfide solid electrolyte is low compared to the case of copper only. Even when such an alloy electrochemically reacts with a sulfide solid electrolyte, metal of a higher ionization tendency than copper is believed to react with a sulfide solid electrolyte priorly, which makes it possible to suppress generation of copper sulfide, which is disadvantageous in a charge/discharge reaction. That is, a surface of an anode current collector layer is made from material containing a predetermined alloy like the anode of the present disclosure, which makes it possible to suppress reaction of the anode current collector layer with a sulfide solid electrolyte in an anode mixture layer without newly adding a reaction-inhibiting layer.

DETAILED DESCRIPTION OF EMBODIMENTS

1. Anode 100

Figure 1:
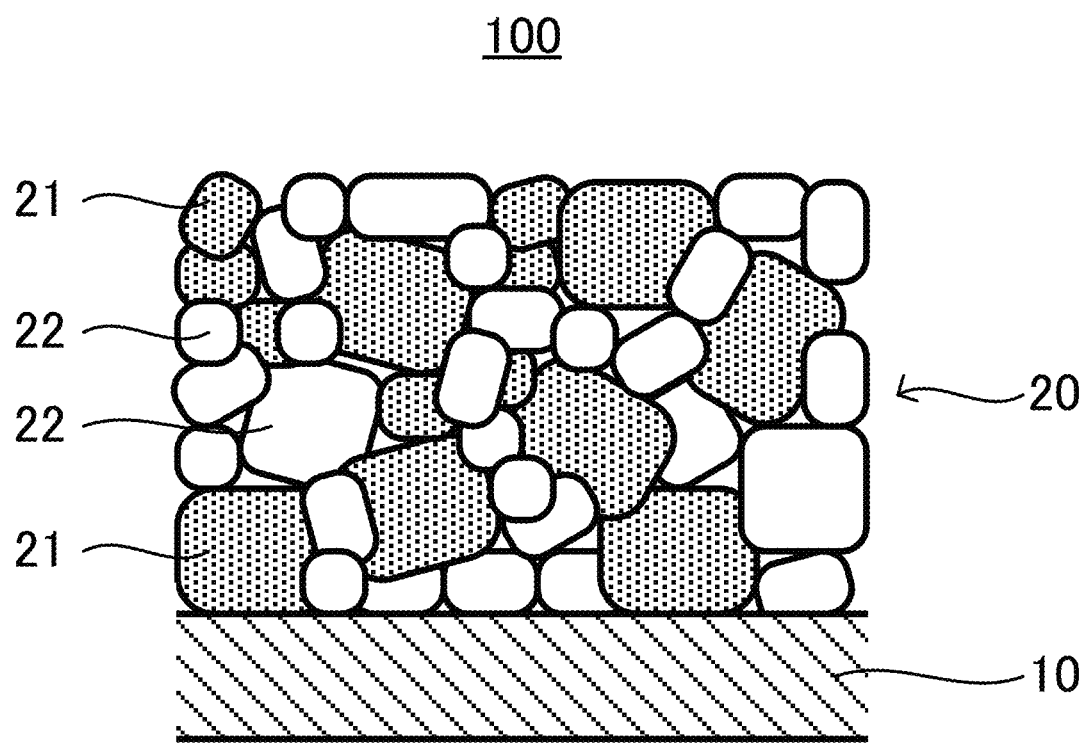
FIG. 1 is an explanatory schematic view of one example of an anode 100.
Figure 2A:
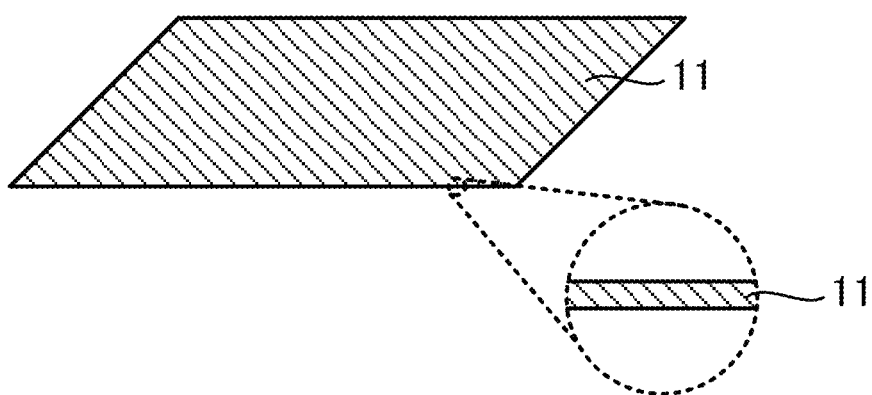
FIGS. 2A to 2C are explanatory schematic views of examples of an anode current collector 10.
Figure 2B:
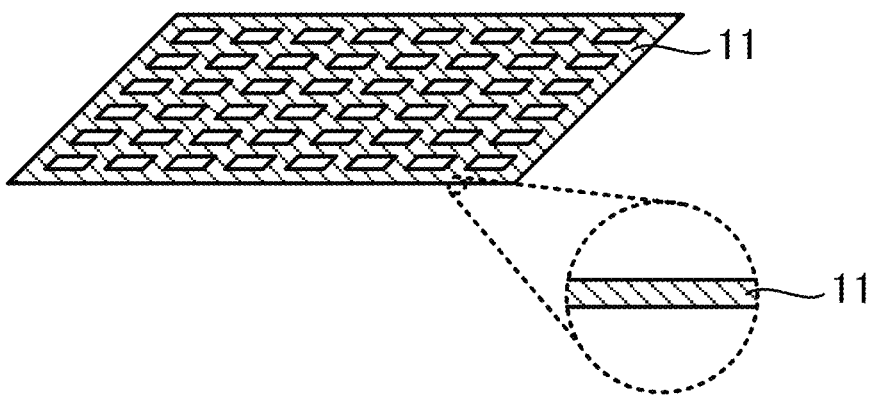
Figure 2C:
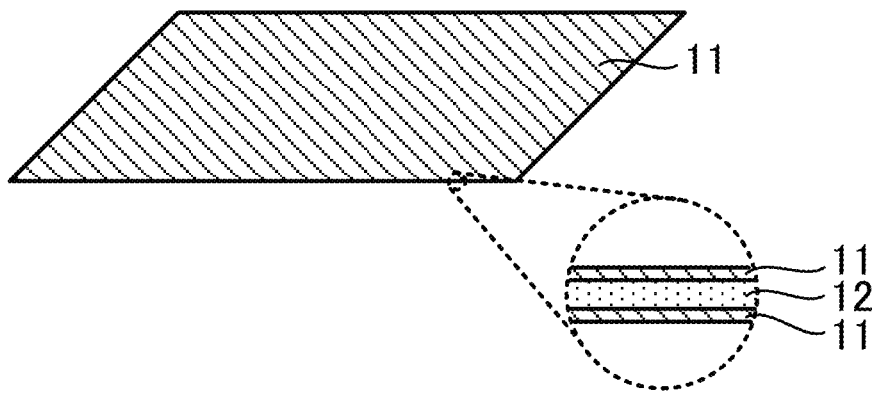

An anode 100 includes an anode mixture layer 20 and an anode current collector layer 10 that is in contact with the anode mixture layer 20 as shown in FIG. 1. The anode mixture layer 20 contains an anode active material 21 and a sulfide solid electrolyte 22 as shown in FIG. 1. At least a surface of the anode current collector layer 10 which is in contact with the anode mixture layer 20 is made from material 11 that contains an alloy of copper and metal of a higher ionization tendency than copper as shown in FIGS. 1 to 2C.

1.1. Anode Current Collector Layer 10

At least the surface of the anode current collector layer 10, which is in contact with the anode mixture layer 20, is made from the material 11 that contains an alloy of copper and metal of a higher ionization tendency than copper. Whereby, reaction of the anode current collector layer 10 with the sulfide solid electrolyte 22 in the anode mixture layer 20 is suppressed. It can be easily determined whether or not the surface of the anode current collector layer 10 is made from the material 11 by elementary analysis or the like of the surface of the anode current collector layer 10. Specific example of a metal of a higher ionization tendency than copper include bismuth (Bi), antimony (Sb), lead (Pb), tin (Sn), nickel (Ni), cobalt (Co), cadmium (Cd), iron (Fe), chromium (Cr), zinc (Zn), tantalum (Ta), manganese (Mn), zirconium (Zr), titanium (Ti), aluminum (Al), beryllium (Be), thorium (Th), magnesium (Mg), sodium (Na), calcium (Ca), strontium (Sr), barium (Ba), potassium (K), rubidium (Rb), cesium (Cs) and lithium (Li). Among them, zinc (Zn), beryllium (Be) and tin (Sn) are preferable, and zinc (Zn) is especially preferable. That is, an alloy described above may contain copper and at least one selected from zinc, beryllium and tin, and may contain copper and zinc. An alloy described above may contain either only one metal of a higher ionization tendency than copper, or two or more of such metals.

Any composition of an alloy of copper and metal of a higher ionization tendency than copper may be employed, and the composition thereof may be properly determined in view of the conductivity of the anode current collector layer 10 etc. For example, such an alloy preferably contains 5 atm % to 99 atm % of copper, and 1 atm % to 95 atm % of metal of a higher ionization tendency than copper (as the total concentration if two or more of such metals are contained), more preferably contains 20 atm % to 96 atm % of copper, and 4 atm % to 80 atm % of metal of a higher ionization tendency than copper, further preferably contains 50 atm % to 96 atm % of copper, and 4 atm % to 50 atm % of metal of a higher ionization tendency than copper, and especially preferably contains 65 atm % to 96 atm % of copper, and 4 atm % to 35 atm % of metal of a higher ionization tendency than copper, if the total of copper and metal of a higher ionization tendency than copper is 100 atm %. Such an alloy may contain incidental impurities. The concentration of incidental impurities therein is preferably no more than 1 atm % if the whole of the alloy is 100 atm %.

The material 11 may contain other elements and constituents other than the alloy in view of contamination etc. as long as the problem can be solved. For example, an incidental oxide film etc. may be partially formed over the surface of the anode current collector layer 10. That is, the material 11 may contain an incidental oxide etc. The material 11 may contain incidental moisture as well. The material 11 may partially contain metal of a lower ionization tendency than copper as long as the problem can be solved. Preferably, the material 11 substantially consists of an alloy of copper and metal of a higher ionization tendency than copper in view of exerting a more significant effect.

At least the surface of the anode current collector layer 10, which is in contact with the anode mixture layer 20, has only to be made from the material 11, and the anode current collector layer 10 may take any form (shape). Only the surface of the anode current collector layer 10 may be made from the material 11, and the surface and all the inside thereof may be made from the material 11. For example, the anode current collector layer 10 may be an anode current collector layer 10a that consists of the material 11 in the form of foil or a sheet as shown in FIG. 2A, and may be an anode current collector layer 10b that consists of the material 11 in the form of mesh or a punched metal as shown in FIG. 2B. The anode current collector layers 10a and 10b can be easily produced by, for example, shaping the material 11. Alternatively, the anode current collector layer 10 may be an anode current collector layer 10c that is made by covering the surfaces of a base material 12 made from a different material than the material 11 with the material 11 as shown in FIG. 2C. That is, the surface and the inside of the anode current collector layer 10 may be made from different materials. The anode current collector layer 10c can be easily produced by, for example, thinly covering the surfaces of the base material 12 with the material 11 by plating, spattering, or the like. The base material 12 has only to secure a mechanical strength and durability as the anode current collector layer 10c. For example, the base material 12 may be made from either a metal different from the material 11, or a material other than metal (such as resin).

The thickness of the anode current collector layer 10 is not specifically limited, can be the same as that of an anode current collector layer in a conventional anode, and for example, is preferably 0.1 μm to 1 mm and is more preferably 1 μm to 100 μm. According to findings of the inventors of the present disclosure, at least the surface of the anode current collector layer 10, which is in contact with the anode mixture layer 20, is made from the material 11, which makes it possible to suppress reaction of the anode current collector layer 10 with the sulfide solid electrolyte 22 in the anode mixture layer 20 independently of the thickness of the anode current collector layer 10. At least a part of the surface of the anode current collector layer 10 which is in contact with the sulfide solid electrolyte 22 may be made from the material 11.

There is a case where the anode mixture layer 20 is roll-pressed at high pressure together with the anode current collector layer 10 in view of improving the filling factor of the anode mixture layer 20 when the anode 100 is produced. Here, fractures of the anode current collector layer 10 in roll press are preferably suppressed in view of productivity etc. For example, it is effective for suppressing fractures of an anode current collector layer in roll press to thicken the anode current collector layer. However, a thickened anode current collector layer 10 in the anode 100 lowers the volumetric energy density of a battery. Therefore, fractures of the anode current collector layer 10 in roll press are preferably suppressed as the anode current collector layer 10 is thickened as little as possible.

According to new findings of the inventors of the present disclosure, the anode current collector layer 10 having a predetermined mechanical strength makes it possible to suppress its fractures in roll press on the anode 100. Specifically, the tensile strength of the anode current collector layer 10 is preferably no less than 500 MPa. Alternatively, the anode current collector layer 10 is more preferably made by containing metal foil having tensile strength of no less than 500 MPa. The lower limit of the tensile strength is more preferably no less than 600 MPa, and further preferably no less than 800 MPa. The upper limit thereof is not specifically restricted. The anode current collector layer 10 having such tensile strength can be easily made by, for example, adjusting the composition of an alloy in the anode current collector layer 10, or work-hardening the anode current collector layer 10. If a work-hardened anode current collector layer is further heat-treated, for example, is annealed, the tensile strength of the anode current collector layer tends to lower.

"Tensile strength of the anode current collector layer" in the present application refers to tensile strength measured conforming to JIS Z 2241: 2011, using the anode current collector layer (for example, metal foil) itself as a test piece.

According to new findings of the inventors of the present disclosure, fractures of the anode current collector layer 10 in roll press on the anode 100 can be suppressed when the elongation after fractures of the anode current collector layer 10 is no less than a predetermined percentage. Specifically, the elongation after fractures of the anode current collector layer 10 is preferably no less than 7.95%. Alternatively, the anode current collector layer 10 is more preferably made by containing metal foil having an elongation after fractures of no less than 7.95%. The lower limit of the elongation after fractures is more preferably no less than 14%. The anode current collector layer 10 having such an elongation after fractures can be easily made by, for example, adjusting the composition of an alloy in the anode current collector layer 10.

"Elongation after fractures of the anode current collector layer" in the present application refers to an elongation after fractures measured conforming to JIS Z 2241: 2011, using the anode current collector layer (for example, metal foil) itself as a test piece.

1.2. Anode Mixture Layer 20

The anode mixture layer 20 includes the anode active material 21 and the sulfide solid electrolyte 22 as shown in FIG. 1. The anode mixture layer 20 contains the sulfide solid electrolyte 22, which results in contact between a part of the surface of the anode current collector layer 10, which is in contact with the anode mixture layer 20, and the sulfide solid electrolyte 22. The anode mixture layer 20 may optionally contain a conductive additive, binder, and other additives (such as thickener).

Any known one as an anode active material of a sulfide solid-state battery can be employed for the anode active material 21 contained in the anode mixture layer 20. Among known active materials, a material displaying a baser charge/discharge potential than a cathode active material 41 described later may be used as an anode active material. Examples thereof include silicon-based active materials such as Si, Si alloys and silicon oxide; carbon-based active materials such as graphite and hard carbon; various oxide-based active materials such as lithium titanate; and lithium metals and lithium alloys. One may be used individually, or two or more may be mixed to be used as the anode active material 21. The shape of the anode active material 21 is not specifically restricted, and for example, is preferably a particulate or thin filmlike shape. The content of the anode active material 21 in the anode mixture layer 20 is not specifically restricted, and may be equivalent to that in a conventional anode mixture layer.

There is a risk of reaction of copper with a sulfide solid electrolyte at OCV of a silicon-based active material in a conventional anode when an anode mixture layer containing the silicon-based active material and the sulfide solid electrolyte is layered onto a surface of an anode current collector layer made from copper to compose the anode. That is, there is a risk of reaction of the anode current collector layer with the sulfide solid electrolyte in the anode mixture layer just after the anode mixture layer is formed over the surface of the anode current collector layer. In contrast, reaction of the anode current collector layer 10 with the sulfide solid electrolyte 22 in the anode mixture layer 20 is suppressed in the anode 100 of the present disclosure even when the anode mixture layer 20 containing a silicon-based active material and the sulfide solid electrolyte is layered to compose the anode 100 since the surface of the anode current collector layer 10, which is in contact with the anode mixture layer 20, is made from the material 11. That is, a fine effect can be exerted in the anode 100 of the present disclosure even if the anode active material 21 contains a silicon-based active material.

Any known one as a sulfide employed for a solid electrolyte of a sulfide solid-state battery can be employed for the sulfide solid electrolyte 22 contained in the anode mixture layer 20. Examples thereof include solid electrolytes containing Li, P and S as constituent elements. Specific examples thereof include $Li_2S$—$P_2S_5$, $Li_2S$—$SiS_2$, $LiI$—$Li_2S$—$SiS_2$, $LiI$—$Si_2S$—$P_2S_5$, $LiI$—$LiBr$—$Li_2S$—$P_2S_5$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$ and $Li_2S$—$P_2S_5$—$GeS_2$. Specifically, a sulfide solid electrolyte containing $Li_2S$—$P_2S_5$ among them is more preferable. One may be used alone, or two or more may be mixed to be used as the sulfide solid electrolyte 22. The shape of the sulfide solid electrolyte 22 is not specifically limited, and for example, may be a particulate shape. The content of the sulfide solid electrolyte 22 in the anode mixture layer 20 is not specifically limited, and may be equivalent to that in a conventional anode mixture layer.

The anode mixture layer 20 may contain an inorganic solid electrolyte other than the sulfide solid electrolyte 22 in addition to the sulfide solid electrolyte 22 as long as a desired effect can be brought about. Examples thereof include oxide solid electrolytes.

Any one known as a conductive additive employed for a sulfide solid-state battery can be employed for a conductive additive contained in the anode mixture layer 20 as an optional constituent. Examples thereof include carbon materials such as acetylene black (AB), Ketjen black (KB), vapor grown carbon fiber (VGCF), carbon nanotubes (CNT), carbon nanofiber (CNF), and graphite; and metallic materials such as nickel, aluminum, and stainless steel. Especially carbon materials are preferable. One conductive additive may be used individually, or two or more conductive additives may be mixed to be used. The shape of the conductive additive is not specifically limited, and for example, is preferable a particulate or fibrous shape. The content of the conductive additive in the anode mixture layer 20 is not specifically limited, and may be equivalent to that in a conventional anode mixture layer.

Any known one as binder employed in a sulfide solid-state battery can be employed for binder contained in the anode mixture layer 20 as an optional constituent. Examples thereof include styrene-butadiene rubber (SBR), carboxymethyl cellulose (CMC), acrylonitrile-butadiene rubber (ABR), butadiene rubber (BR), polyvinylidene fluoride (PVdF), polytetrafluoroethylene (PTFE), and polyimides (PI). One binder may be used individually, or two or more binders may be mixed to be used. The content of the binder in the anode mixture layer 20 is not specifically limited, and may be equivalent to that in a conventional anode mixture layer.

The anode 100 having the structure described above can be easily produced by passing through processes such as putting and kneading the anode active material 21, the sulfide solid electrolyte 22, and a conductive additive, binder, etc. which are optionally contained, in nonaqueous solvent to obtain a slurry electrode composition, and thereafter applying this electrode composition to the surface of the anode current collector layer 10, drying the surface, and optionally pressing the anode current collector layer 10. The anode 100 can be produced by not only such a wet process, but also, for example, press molding in a dry process. The thickness of the anode mixture layer 20 is, for example, preferably 0.1 μm to 1 mm, and more preferably 1 μm to 100 μm when the anode mixture layer 20 in the form of a sheet is formed over the surface of the anode current collector layer 10 as described above.

2. Sulfide Solid-State Battery 1000

Figure 3:
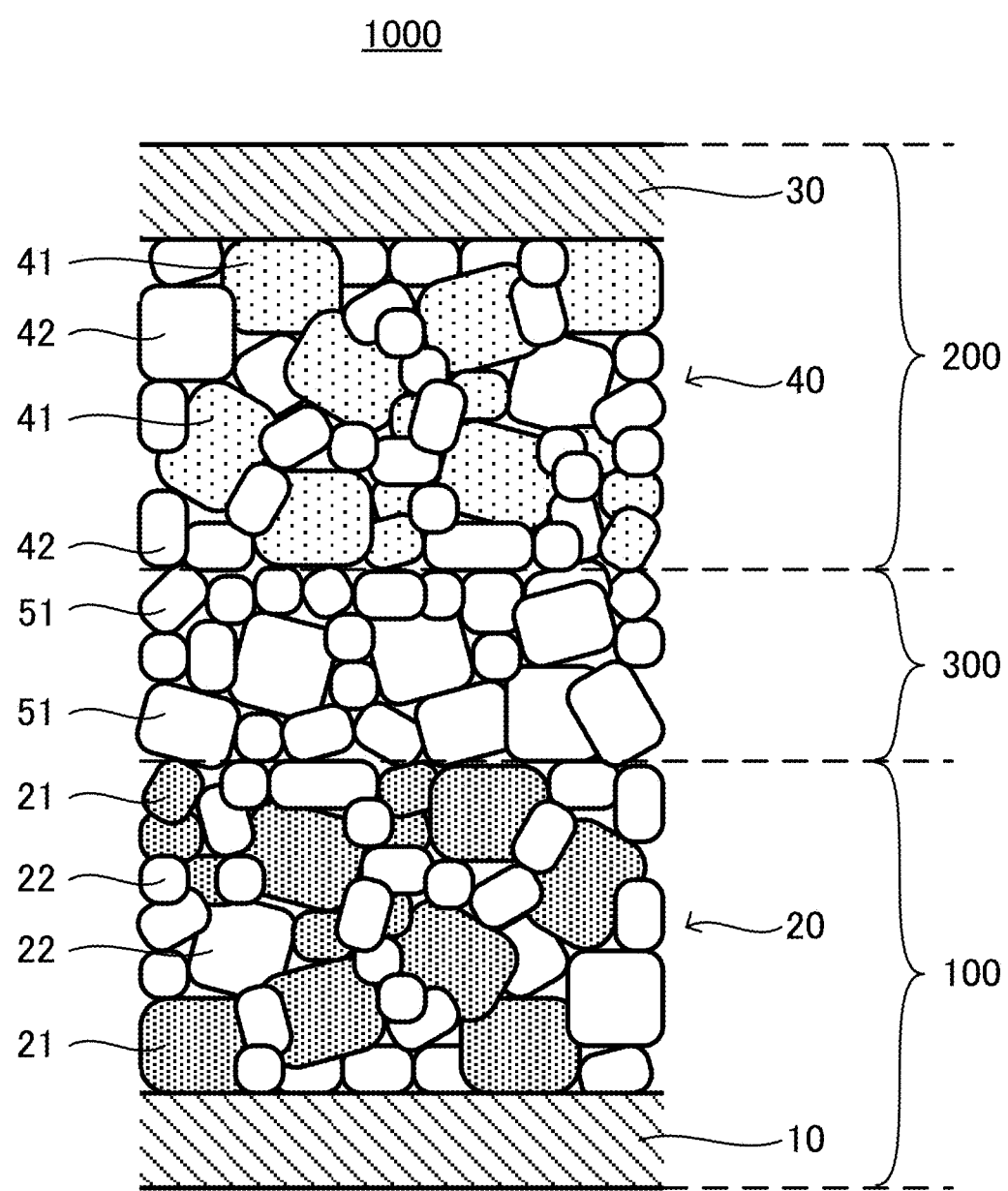
FIG. 3 is an explanatory schematic view of structure of a sulfide solid-state battery 1000.

FIG. 3 schematically shows structure of a sulfide solid-state battery 1000. The sulfide solid-state battery 1000 includes the anode 100 of the present disclosure, a cathode 200, and a solid electrolyte layer 300 provided between the anode 100 and the cathode 200. The solid electrolyte layer 300 is in contact with the anode mixture layer 20 of the anode 100, and a cathode mixture layer 40 of the cathode 200. Terminals, a battery case, etc. are omitted to be shown in FIG. 3. The structure of the cathode 200 and the solid electrolyte layer 300 in the sulfide solid-state battery 1000 is obvious, and hereinafter one example will be described.

2.1. Cathode 200

The cathode 200 includes the cathode mixture layer 40, and the cathode current collector layer 30 that is in contact with the cathode mixture layer 40 as shown in FIG. 3.

2.1.1. Cathode Current Collector Layer 30

The cathode current collector layer 30 may be composed of metal foil, a metal mesh, etc., and is especially preferably composed of metal foil. Examples of a metal constituting the cathode current collector layer 30 include stainless steel, nickel, chromium, gold, platinum, aluminum, iron, titanium and zinc. The cathode current collector layer 30 may be metal foil or a base material, a surface of which is plated with metal as described above, or on the surface of which metal as described above is deposited. The thickness of the cathode current collector layer 30 is not specifically limited, and for example, is preferably 0.1 μm to 1 mm, and is more preferably 1 μm to 100 μm.

2.1.2. Cathode Mixture Layer 40

The cathode mixture layer 40 contains the cathode active material 41 as shown in FIG. 3. The cathode mixture layer 40 may optionally contain a solid electrolyte 42, a conductive additive, binder, and other additives (such as thickener).

Any known one as a cathode active material of a sulfide solid-state battery can be employed for the cathode active material 41 contained in the cathode mixture layer 40. Among known active materials, a material displaying a nobler charge/discharge potential than the anode active material 21 described above may be used as a cathode active material. Examples of the cathode active material 41 include lithium-containing oxides such as lithium cobaltate, lithium nickelate, Li(Ni,Mn,Co)O$_2$(Li$_{1+\alpha}$Ni$_{1/3}$Mn$_{1/3}$Co$_{1/3}$O$_2$), lithium manganate, spinel lithium composite oxides, lithium titanate, and lithium metal phosphates (LiMPO$_4$ where M is at least one selected from Fe, Mn, Co and Ni). One may be used individually, or two or more may be mixed to be used as the cathode active material 41. The cathode active material 41 may have a coating layer of lithium niobate, lithium titanate, lithium phosphate, or the like, over its surface. The shape of the cathode active material 41 is not specifically restricted, and for example, is preferably a particulate or thin filmlike shape. The content of the cathode active material 41 in the cathode mixture layer 40 is not specifically restricted, and may be equivalent to that in a conventional cathode mixture layer.

Any known one as a sulfide solid electrolyte of a sulfide solid-state battery can be employed as the solid electrolyte 42 contained in the cathode mixture layer 40 as an optional constituent. For example, a sulfide solid electrolyte as described above is preferably employed. An inorganic solid electrolyte other than a sulfide solid electrolyte may be contained in addition to a sulfide solid electrolyte as long as a desired effect can be brought about. The shape of the solid electrolyte 42 is not specifically limited, and for example, is preferably a particulate shape. The content of the solid electrolyte 42 in the cathode mixture layer 40 is not specifically limited, and may be equivalent to that in a conventional cathode mixture layer.

Any one known as a conductive additive employed for a sulfide solid-state battery can be employed as a conductive additive contained in the cathode mixture layer 40 as an optional constituent. Examples thereof include carbon materials such as acetylene black (AB), Ketjen black (KB), vapor grown carbon fiber (VGCF), carbon nanotubes (CNT), carbon nanofiber (CNF), and graphite; and metallic materials such as nickel, aluminum, and stainless steel. Especially carbon materials are preferable. One conductive additive may be used individually, or two or more conductive additives may be mixed to be used. The shape of the conductive additive is not specifically limited, and for example, is preferably a particulate shape. The content of the conductive additive in the cathode mixture layer 40 is not specifically limited, and may be equivalent to that in a conventional cathode mixture layer.

Any known one as binder employed in a sulfide solid-state battery can be employed for binder contained in the cathode mixture layer 40 as an optional constituent. Examples thereof include styrene-butadiene rubber (SBR), carboxymethyl cellulose (CMC), acrylonitrile-butadiene rubber (ABR), butadiene rubber (BR), polyvinylidene fluoride (PVdF), and polytetrafluoroethylene (PTFE). One binder may be used individually, or two or more binders may be mixed to be used. The content of the binder in the cathode mixture layer 40 is not specifically limited, and may be equivalent to that in a conventional cathode mixture layer.

The cathode 200 having the structure described above can be easily produced by passing through processes such as putting and kneading the cathode active material 41, and the solid electrolyte 42, binder, a conductive additive, etc. which are optionally contained, in nonaqueous solvent to obtain a slurry electrode composition, and thereafter applying this electrode composition to a surface of the cathode current collector layer 30, drying the surface, and optionally pressing the cathode current collector layer 30. The cathode 200 can be produced by not only such a wet process, but also, for example, press molding in a dry process. The thickness of the cathode mixture layer 40 is, for example, preferably 0.1 μm to 1 mm, and more preferably 1 μm to 100 μm when the cathode mixture layer 40 in the form of a sheet is formed over a surface of the cathode current collector layer 30 as described above.

2.2. Solid Electrolyte Layer 300

The solid electrolyte layer 300 has functions of insulating the anode 100 from the cathode 200, and conducting a lithium ion between the anode 100 and the cathode 200. The solid electrolyte layer 300 contains at least a solid electrolyte 51. The solid electrolyte layer 300 preferably contains binder.

2.2.1. Solid Electrolyte

The solid electrolyte 51 contained in the solid electrolyte layer 300 may be properly selected from the examples of solid electrolytes that may be contained in the anode mixture layer 20 and the cathode mixture layer 40. Specifically, a sulfide solid electrolyte is preferable, and a sulfide solid electrolyte containing $Li_2S$—$P_2S_5$ is more preferable. One may be used individually, or two or more may be mixed to be used as the solid electrolyte 51. The shape of the solid electrolyte 51 may be a popular shape, that is, a particulate shape. The content of the solid electrolyte 51 in the solid electrolyte layer 300 is not specifically restricted, and may be properly determined according to the performance of the battery to be aimed. For example, the content of the solid electrolyte is preferably no less than 90 mass %, and more preferably no less than 95 mass % if the whole of the solid electrolyte layer 300 is 100 mass %.

2.2.2. Binder

The solid electrolyte layer 300 is preferably contains binder. Binder that may be contained in the solid electrolyte layer 300 is publicly known. For example, binder may be properly selected from the examples of binder that may be contained in the anode mixture layer 20 and the cathode mixture layer 40.

The solid electrolyte layer 300 having the structure described above can be easily produced by passing through processes such as putting and kneading the solid electrolyte 51, and optionally contained binder etc., in nonaqueous solvent to obtain a slurry electrolyte composition, and thereafter applying this electrolyte composition to surfaces of a base material (or the surface of the anode mixture layer 20 or the surface of the cathode mixture layer 40), drying the surfaces, and optionally pressing the base material. The solid electrolyte layer 300 can be produced by not only such a wet process, but also, for example, press forming in a dry process. The thickness of the solid electrolyte layer 300 is, for example, preferably 0.1 μm to 1 mm, and more preferably 1 μm to 100 μm when the solid electrolyte layer 300 in the form of a sheet is formed as described above.

2.3. Other Components

All the components of the sulfide solid-state battery 1000 are not necessarily solids. The sulfide solid-state battery 1000 may partially contain liquids such as electrolyte solution as long as the battery performance is not spoiled.

For example, the sulfide solid-state battery 1000 having the above described structure can be produced as follows: that is, a method for producing the sulfide solid-state battery 1000 includes a step of producing the anode 100, the cathode 200 and the solid electrolyte layer 300 according to the above described ways, and a step of layering the anode 100, the cathode 200 and the solid electrolyte layer 300. The sulfide solid-state battery 1000 can be produced by, for example, layering the anode 100, the solid electrolyte layer 300 and the cathode 200 as described above to form a laminate, attaching proper terminals etc. thereto, and then sealing up the laminate in the battery case.

EXAMPLES

Figure 4:
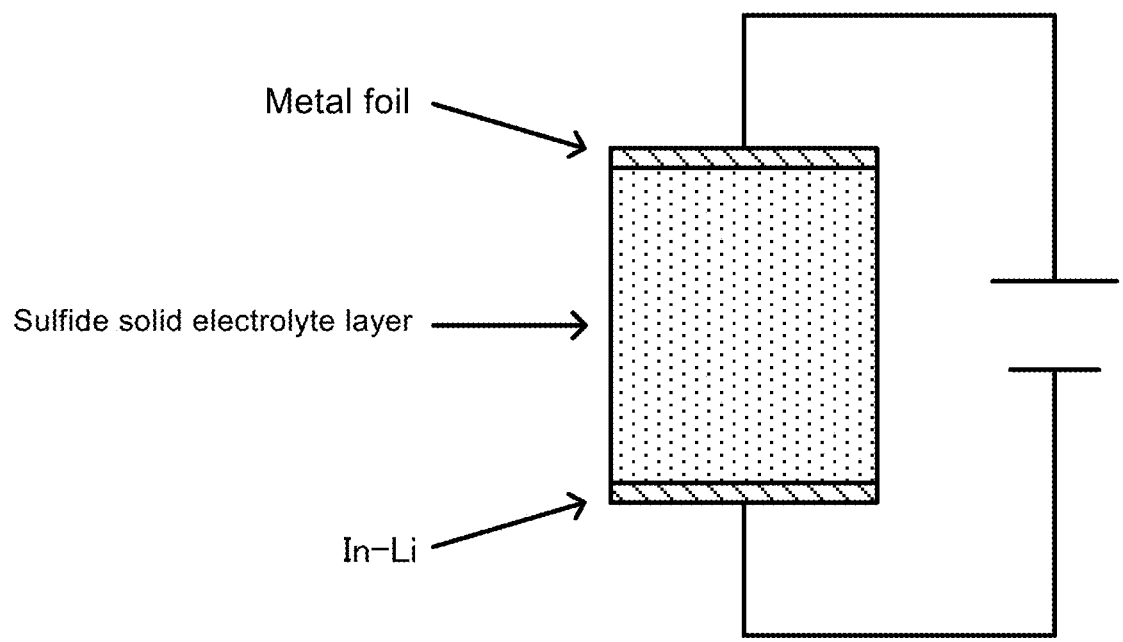
FIG. 4 is an explanatory schematic view of structure of an evaluation device used in Examples.

1. Evaluation of Reactivity of Anode Current Collector Layer to Sulfide Solid Electrolyte As shown in FIG. 4, a layer made from a sulfide solid electrolyte (its main constituent is $Li_2S$—$P_2S_5$) (thickness: 450 μm) was sandwiched between predetermined metal foil and In–Li foil (thickness: 80 μm), and the metal foil and the In—Li foil were connected to a power source, to evaluate the reactivity of the metal foil to the sulfide solid electrolyte by cyclic voltammetry (CV). The types of the metal foil used in Examples and Comparative Examples were as follows.

Comparative Example 1 . . . copper (Cu) foil of 10 μm in thickness

Example 1 . . . copper-beryllium alloy (CuBe) foil of 10 μm in thickness, copper:beryllium=88 atm %:12 atm %

Example 2 . . . copper-zinc alloy (CuZn) foil of 10 μm in thickness, copper:zinc=65 atm %:35 atm %

Example 3 . . . copper-tin alloy (CuSn) foil (slightly containing phosphorous (P) as an impurity) of 10 μm in thickness, copper:tin=96 atm %:3 atm %

Comparative Example 2 . . . copper-silver alloy (CuAg) foil of 50 μm in thickness, copper:silver=81 atm %:19 atm %.

Figure 5:
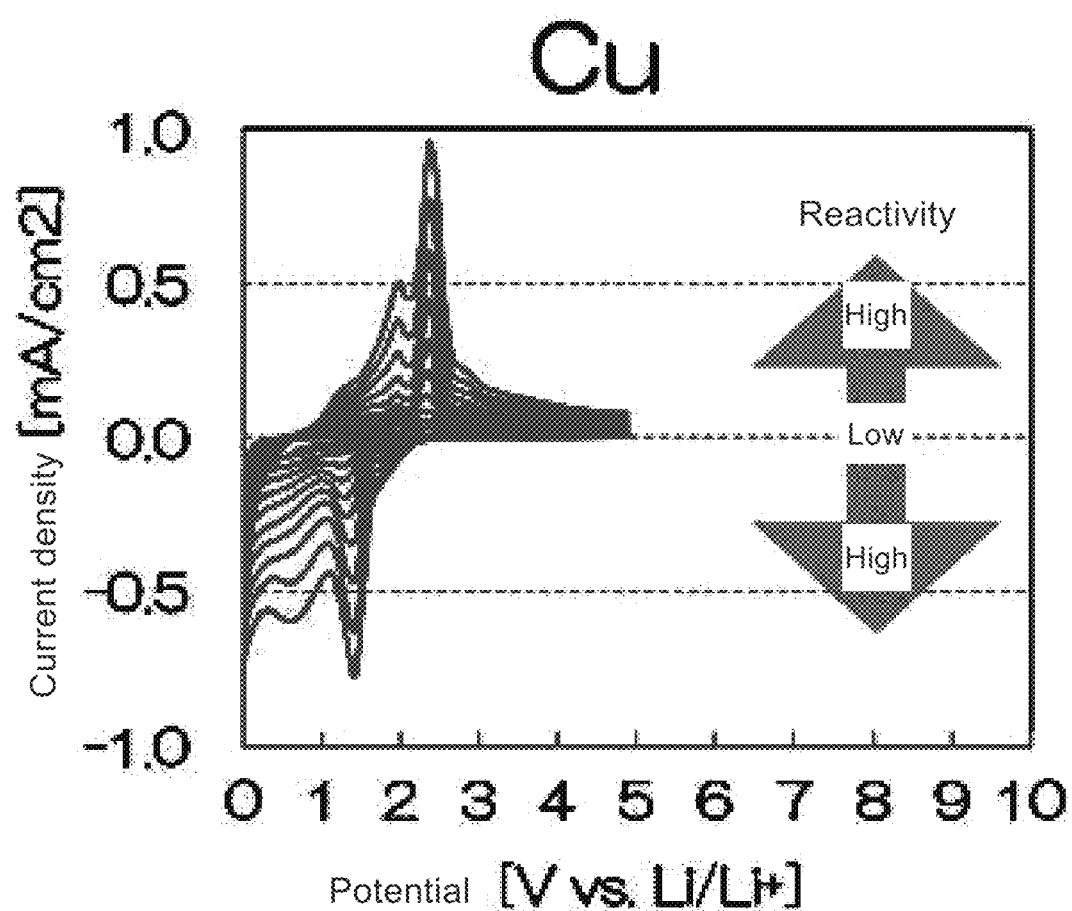
FIG. 5 shows a CV evaluation result of Comparative Example 1.

FIGS. 5 to 9 show CV results of Examples and Comparative Examples. FIG. 5 corresponds to Comparative Example 1, FIG. 6 corresponds to Example 1, FIG. 7 corresponds to Example 2, FIG. 8 corresponds to Example 3 and FIG. 9 corresponds to Comparative Example 2. Values represented by the vertical axis in FIG. 5 are 100 times as large as those in FIGS. 6 to 8. It can be said that the electrochemical reactivity to the sulfide solid electrolyte was high as the current density (vertical axis) widely fluctuates in FIGS. 5 to 9.

As is apparent from the result shown in FIG. 5, it is found that the current density widely fluctuated in CV, and the electrochemical reactivity of the copper foil to the sulfide solid electrolyte was high in Comparative Example 1 of using the copper foil as the metal foil.

Figure 6:
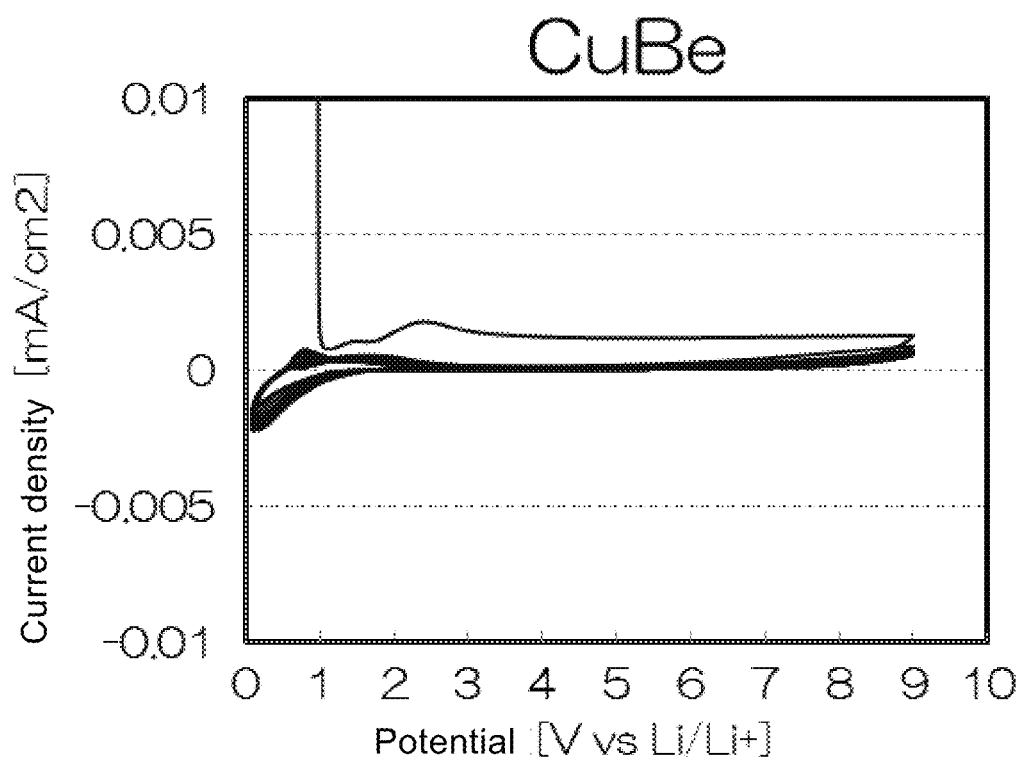
FIG. 6 shows a CV evaluation result of Example 1.
Figure 7:
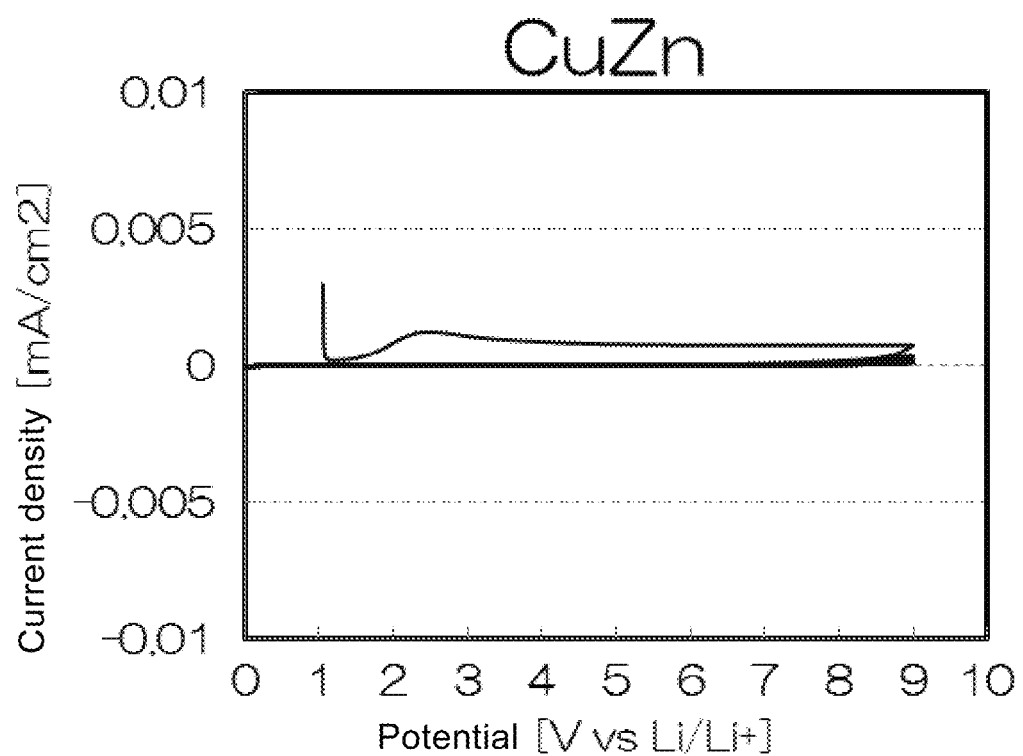
FIG. 7 shows a CV evaluation result of Example 2.
Figure 8:
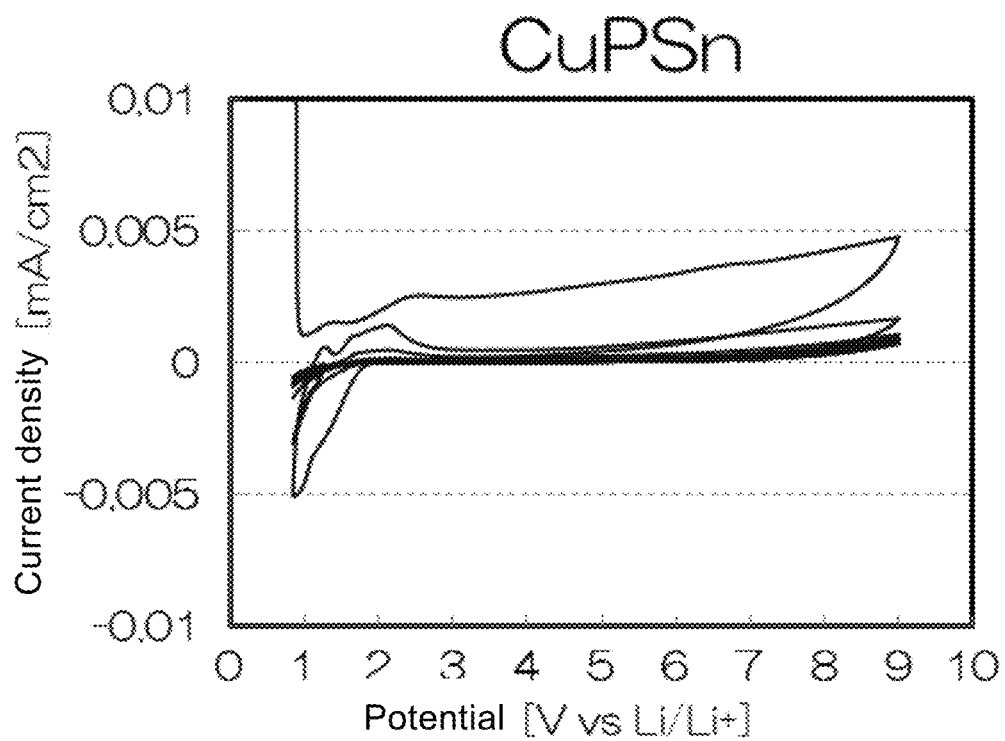
FIG. 8 shows a CV evaluation result of Example 3.

In contrast, as is apparent from the results shown in FIGS. 6 to 8, it is found that the current density narrowly fluctuated in CV, and the electrochemical reactivity of the alloy foil to the sulfide solid electrolyte was low (approximately a thousandth of Comparative Example 1) in Examples 1 to 3 of using the alloy foil of copper and metal of a higher ionization tendency than copper (beryllium, zinc or tin). Specifically, the electrochemical reactivity of the alloy foil to the sulfide solid electrolyte is found to have been further low in Example 2 of using the alloy foil of copper and zinc.

As is also apparent from the results shown in FIGS. 6 to 8, the reaction of the alloy foil with the sulfide solid electrolyte was hard to progress even if CV was repeated in Examples 1 to 3. That is, it is imagined that although the alloy reacted with the sulfide solid electrolyte over a surface of the alloy foil which was in contact with the sulfide solid electrolyte, the reaction of this alloy with the sulfide solid electrolyte was difficult to advance to the depth of the alloy foil. That is, it is believed that at least a surface of foil which is in contact with a sulfide solid electrolyte is made from material containing a predetermine alloy, which makes it possible to secure a sufficient effect independently of the thickness of the foil.

Figure 9:
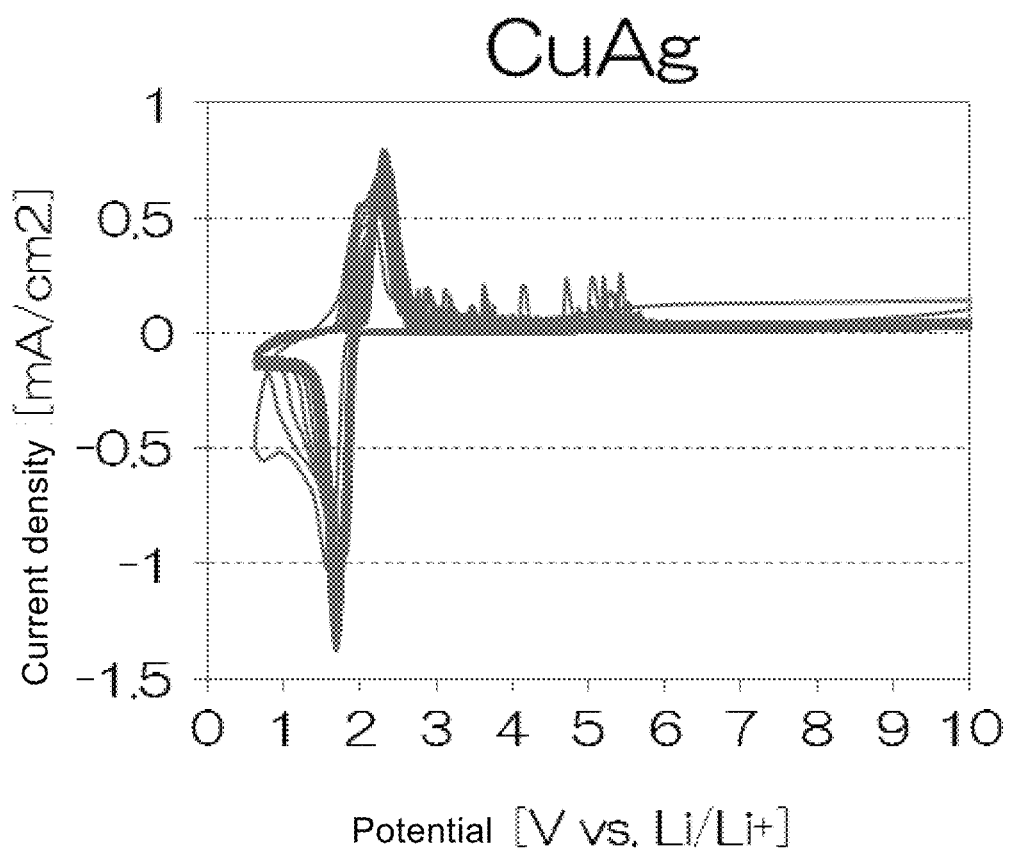
FIG. 9 shows a CV evaluation result of Comparative Example 2.

As is apparent from the result shown in FIG. 9, it is found that the reaction of the alloy foil with the sulfide solid electrolyte was not able to be suppressed in Comparative Example 2 of using the alloy foil of copper and metal of a lower ionization tendency than copper (silver), unlike Examples 1 to 3.

Beryllium, zinc and tin were given as examples of metal of a higher ionization tendency than copper in Examples 1 to 3. The technique of the present disclosure is believed to exert the same effect as well when a metal other than them are used as metal of a higher ionization tendency than copper. Specific examples other than beryllium, zinc and tin include bismuth (Bi), antimony (Sb), lead (Pb), nickel (Ni), cobalt (Co), cadmium (Cd), iron (Fe), chromium (Cr), tantalum (Ta), manganese (Mn), zirconium (Zr), titanium (Ti), aluminum (Al), thorium (Th), magnesium (Mg), sodium (Na), calcium (Ca), strontium (Sr), barium (Ba), potassium (K), rubidium (Rb), cesium (Cs) and lithium (Li).

Copper-based alloys having predetermined compositions were given in Examples 1 to 3. The composition of a copper-based alloy is not specifically restricted in the technique of the present disclosure. This composition may be properly determined according to the performance of the battery to be aimed in view of the reactivity to the sulfide solid electrolyte, conductivity as an anode current collector layer, etc.

2. Examination on Mechanical Strength of Anode Current Collector Layer 2.1. Tensile Strength A solution of butyl butyrate and 5 wt % of a PVdF based binder (manufactured by Kureha Corporation), silicone (manufactured by Kojundo Chemical Laboratory Co., Ltd., 5 μm in mean particle diameter ($D_{50}$)) as an anode active material, and a sulfide solid electrolyte were added into a vessel made from PP, and stirred with an ultrasonic dispersive device (UH-50 manufactured by SMT Corporation) for 30 seconds. Next, the vessel was shaken with a mixer (TTM-1 manufactured by Sibata Scientific Technology Ltd.) for 30 minutes, and the inside thereof was further stirred with the ultrasonic dispersive device for 30 seconds. The vessel was further shaken with the mixer for 3 minutes, to obtain an anode mixture slurry. Sheets of metal foil having various levels of tensile strength were coated with the obtained anode mixture slurry using an applicator according to a blade method. After air-dried, the metal foil was dried on a hot plate at 100° C. for 30 minutes, to form an anode mixture layer on the metal foil. Thereafter, a solid electrolyte layer and a cathode mixture layer which were formed by coating were layered onto the anode mixture layer by transferring, thereafter to be roll-pressed at the maximum linear pressure (linear pressure: 5 t/cm) at 0.5 m/min in feed speed for the purpose of improving the filling factor of an electrode body that was made by transferring (anode mixture layer+solid electrolyte layer+cathode mixture layer) to bring out properties of a battery.

The presence or not of fractures in the roll-pressed metal foil was confirmed. It was found that an anode was able to be produced without fractures in the metal foil independently of the composition of the metal foil when the metal foil having tensile strength of no less than 500 MPa, which was measured conforming to JIS Z 2241: 2011, was used.

Tensile tests were carried out on various types of copper alloy foil and copper foil as follows conforming to JIS Z 2241: 2011, to measure their tensile strength. The results are shown in FIG. 10.

Comparative Example 1A . . . rolled copper (Cu) foil of 10 μm in thickness

Figure 10:
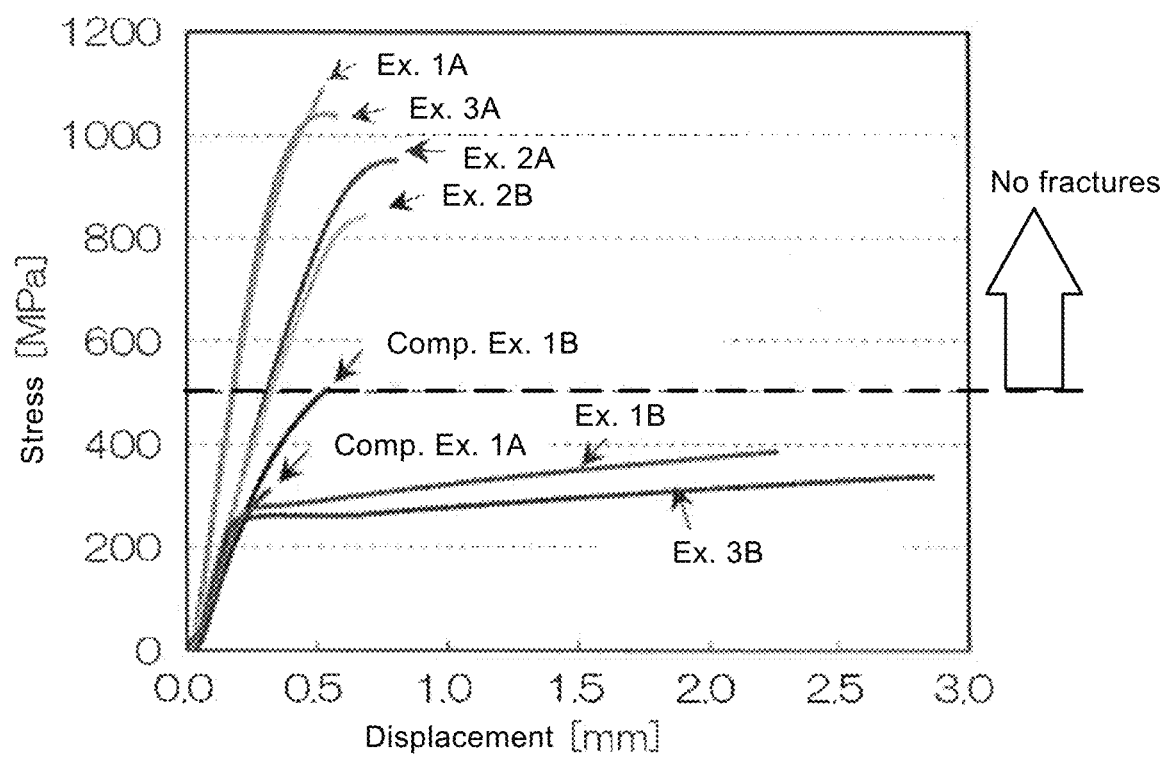
FIG. 10 is a graph of comparing various types of copper alloy foil (Examples 1A to 3A and 1B to 3B) and copper foil (Comparative Examples 1A and 1B) in tensile strength.

Comparative Example 1B . . . high strength copper (Cu) foil (SEED manufactured by Nippon Denkai, Ltd.) of approximately 10 μm in thickness, grain refined for the purpose of improving the strength of the metal Example 1A . . . copper-beryllium alloy (CuBe) foil of 10 μm in thickness, copper:beryllium=88 atm %:12 atm %, work-hardened, not annealed after work-hardened Example 1B . . . copper-beryllium alloy (CuBe) foil of 10 μm in thickness, copper:beryllium=88 atm %:12 atm %, work-hardened, annealed after work-hardened Example 2A . . . copper-zinc alloy (CuZn) foil of 10 μm in thickness, copper:zinc=65 atm %:35 atm %, work-hardened, not annealed after work-hardened Example 2B . . . copper-zinc alloy (CuZn) foil of 10 μm in thickness, copper:zinc=65 atm %:35 atm %, work-hardened, annealed after work-hardened Example 3A . . . copper-tin alloy (CuSn) foil (slightly containing phosphorous (P) as an impurity) of 10 μm in thickness, copper:tin=96 atm %:3 atm %, work-hardened, not annealed after work-hardened Example 3B . . . copper-tin alloy (CuSn) foil (slightly containing phosphorous (P) as an impurity) of 10 μm in thickness, copper:tin=96 atm %:3 atm %, work-hardened, annealed after work-hardened Tensile strength of metal foil of even the same composition and same thickness may vary according to whether or not to be work-hardened and whether or not to be heat-treated (annealed) as shown in FIG. 10. It was found that the copper alloy foil according to Examples 1 to 3 was material having such potential that tensile strength thereof greatly exceeded 500 MPa as shown in FIG. 10, and was able to sufficiently bear roll press when an anode was produced. That is, it can be said that an alloy constituting an anode current collector layer preferably contains copper, and at least one selected from zinc, beryllium and tin.

2.2. Elongation After Fractures

An anode mixture layer was formed over a surface of metal foil through the same procedures as those in the evaluation of the tensile strength, and thereafter was roll-pressed at such a maximum linear pressure (5 t/cm) and feed speed of 0.5 m/min that the filling factor of the anode mixture layer was improved while properties of material of the anode mixture layer was kept.

The presence or not of fractures in the roll-pressed metal foil was confirmed. It was found that an anode was able to be produced without fractures in the metal foil independently of the composition of the metal foil even when the tensile strength of the metal foil was lower than 500 MPa, even if roll pressing at 5 t/cm in linear pressure at 0.5 m/min in feed speed was carried out when the metal foil having an elongation after fractures of no less than 7.95%, which was measured conforming to JIS Z 2241: 2011, was used.

Figure 11:
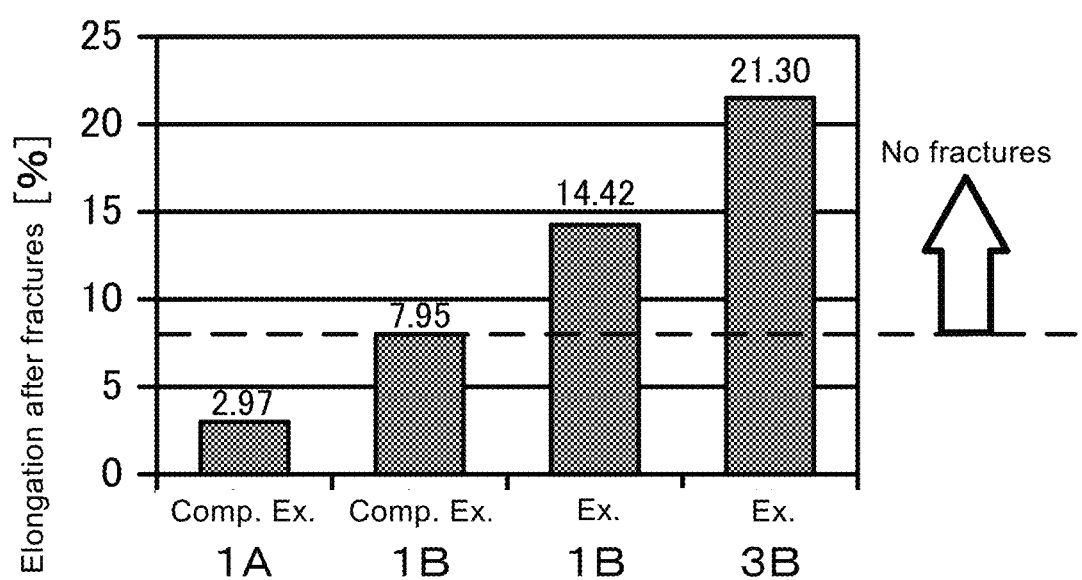
FIG. 11 is a graph of comparing various types of copper alloy foil (Examples 1B and 3B) and copper foil (Comparative Examples 1A and 1B) in elongation after fractures.

The elongations after fractures of the same copper alloy foil as Examples 1B and 3B, and the same copper foil as Comparative Examples 1A and 1B were measured conforming to JIS Z 2241: 2011. The results are shown in FIG. 11. It was found that the elongation after fractures of the copper alloy foil according to Examples 1B and 3B greatly exceeded 7.95% while the tensile strength thereof was lower than 500 MPa as shown in FIGS. 10 and 11, and the copper alloy foil of Examples 1B and 3B was able to sufficiently bear roll press when an anode was produced.

As described above, it was found that an anode current collector layer preferably satisfies at least one of the following requirements (1) and (2) in order to suppress fractures of the anode current collector layer in roll press when an anode is produced:

(1) the tensile strength of the anode current collector layer is no less than 500 MPa; and (2) the elongation after fractures of the anode current collector layer is no less than 7.95%.

INDUSTRIAL APPLICABILITY

A sulfide solid-state battery including the anode of the present disclosure can be preferably used as a power source in a wide range such as a small-sized power source for portable devices and an onboard large-sized power source.

REFERENCE SIGNS LIST

100 anode
10 anode current collector layer
20 anode mixture layer
200 cathode
30 cathode current collector layer
40 cathode mixture layer 300 solid electrolyte layer
1000 sulfide solid-state battery

What is claimed is:

1. An anode comprising:
   an anode mixture layer; and
   an anode current collector layer that is in contact with the anode mixture layer,
   wherein the anode mixture layer contains an anode active material and a sulfide solid electrolyte, and
   at least a surface of the anode current collector layer is made from (a) an alloy containing copper and beryllium, or (b) an alloy containing copper, tin, and phosphorus, the surface being in direct contact with the anode mixture layer without any intervening layer.

2. The anode according to claim 1, wherein the anode active material contains a silicon-based active material.

3. The anode according to claim 1, wherein
   the anode current collector layer is configured to have a tensile strength no less than 500 MPa, and
   the anode is obtained by coating the anode mixture layer on the anode collector layer having the tensile strength.

4. The anode according to claim 1, wherein
   the anode current collector layer is configured to have an elongation after fractures of no less than 7.95%, and
   the anode is obtained by coating the anode mixture layer on the anode collector layer having the elongation after fractures.

5. A sulfide solid-state battery comprising:
   the anode according to claim 1;
   a cathode; and
   a solid electrolyte layer provided between the anode and the cathode.

6. The anode according to claim 1, wherein
   an entire surface and an inside of the anode current collector layer is made from the material.

7. The anode according to claim 1, wherein
   the alloy contains 5 to 99 atm % copper.

8. The anode according to claim 1, wherein the alloy contains copper and beryllium.

9. The anode according to claim 1, wherein the alloy contains copper, tin, and phosphorous.

10. The anode according to claim 2, wherein
    the anode current collector layer is configured to have a tensile strength no less than 500 MPa, and
    the anode is obtained by coating the anode mixture layer on the anode collector layer having the tensile strength.

11. The anode according to claim 2, wherein
    the anode current collector layer is configured to have an elongation after fractures of no less than 7.95%, and
    the anode is obtained by coating the anode mixture layer on the anode collector layer having the elongation after fractures.

12. A sulfide solid-state battery comprising:
    the anode according to claim 2;
    a cathode; and
    a solid electrolyte layer provided between the anode and the cathode.

13. The anode according to claim 2, wherein
    an entire surface and an inside of the anode current collector layer is made from the material.

14. The anode according to claim 1, wherein
    the alloy contains 4 to 35 atm % of metals other than copper.

* * * * *